Feb. 10, 1970 E. C. MUTSCHLER ET AL 3,495,269
ELECTROGRAPHIC RECORDING METHOD AND APPARATUS WITH INSERT GASEOUS DISCHARGE IONIZATION AND ACCELERATION GAPS
Filed Dec. 19, 1966 7 Sheets-Sheet 1
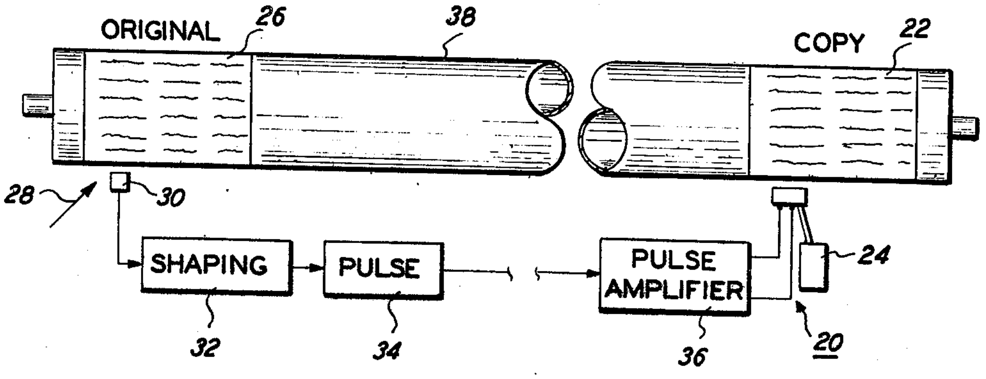
FIG. 1
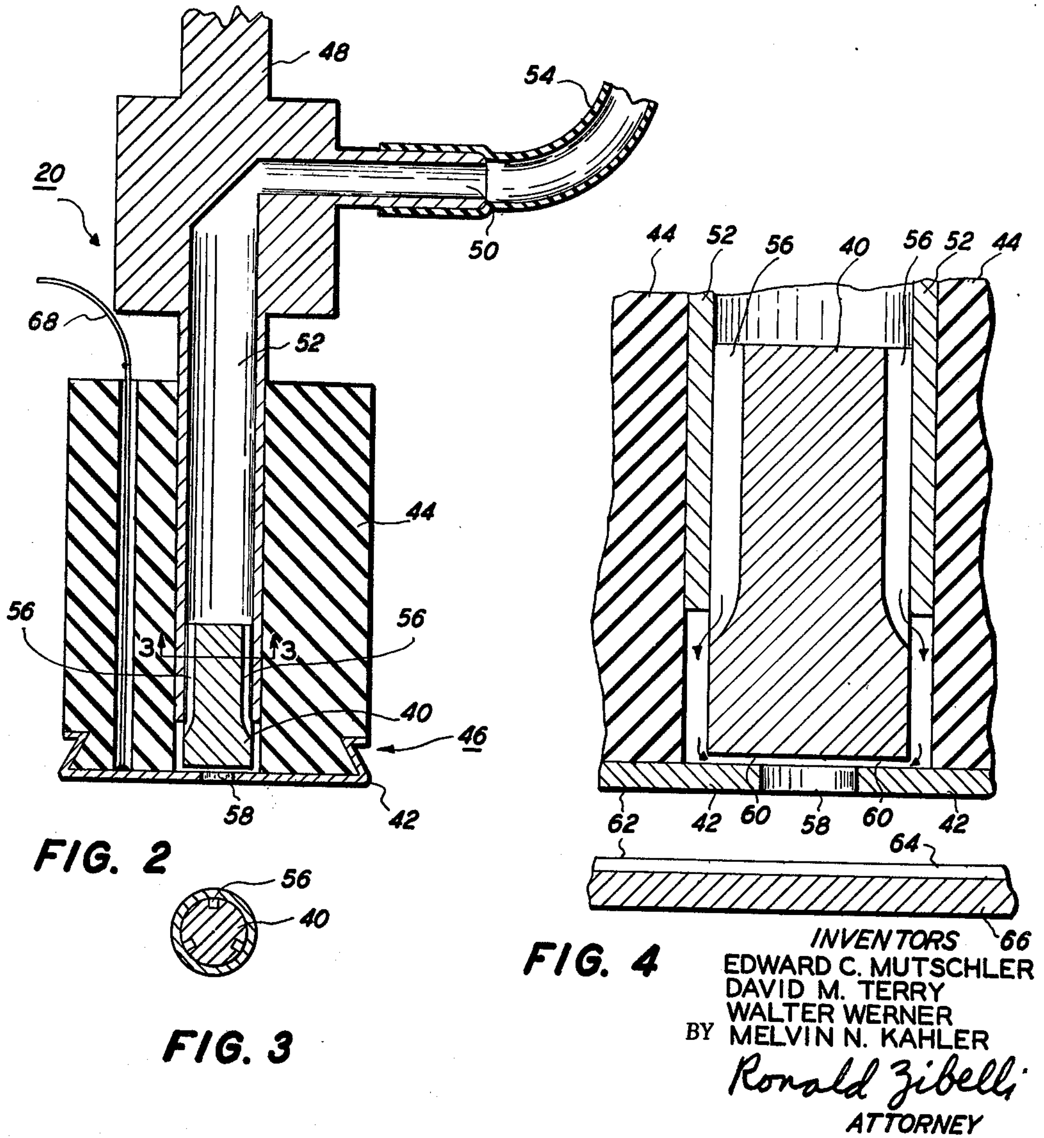
FIG. 2, FIG. 4
FIG. 3
INVENTORS
EDWARD C. MUTSCHLER
DAVID M. TERRY
WALTER WERNER
BY MELVIN N. KAHLER
Ronald Zibelli
ATTORNEY INVENTORS
EDWARD C. MUTSCHLER
DAVID M. TERRY
WALTER WERNER
MELVIN N. KAHLER
BY
Ronald Zibelli
ATTORNEY INVENTORS
EDWARD C. MUTSCHLER
DAVID M. TERRY
WALTER WERNER
MELVIN N. KAHLER
BY Ronald Zibelli
ATTORNEY INVENTORS
EDWARD C. MUTSCHLER
DAVID M. TERRY
WALTER WERNER
MELVIN N. KAHLER
BY Ronald Zibelli
ATTORNEY Feb. 10, 1970 E. C. MUTSCHLER ET AL 3,495,269

ELECTROGRAPHIC RECORDING METHOD AND APPARATUS WITH INSERT GASEOUS DISCHARGE IONIZATION AND ACCELERATION GAPS

Filed Dec. 19, 1966 7 Sheets-Sheet 5

INVENTORS
EDWARD C. MUTSCHLER
DAVID M. TERRY
WALTER WERNER
MELVIN N. KAHLER
BY Ronald Zibelli
ATTORNEY ELECTROGRAPHIC RECORDING METHOD AND APPARATUS WITH INSERT GASEOUS DISCHARGE IONIZATION AND ACCELERATION GAPS
Filed Dec. 19, 1966 7 Sheets-Sheet 6

INVENTORS
EDWARD C. MUTSCHLER
DAVID M. TERRY
WALTER WERNER
BY MELVIN N. KAHLER
Ronald Zibelli
ATTORNEY INVENTORS
EDWARD C. MUTSCHLER
DAVID M. TERRY
WALTER WERNER
MELVIN N. KAHLER
BY Ronald Zibelli
ATTORNEY United States Patent Office 3,495,269
Patented Feb. 10, 1970

3,495,269

ELECTROGRAPHIC RECORDING METHOD AND APPARATUS WITH INERT GASEOUS DISCHARGE IONIZATION AND ACCELERATION GAPS

Edward C. Mutschler, Pittsford, David M. Terry, Webster, Walter Werner, Rochester, and Melvin N. Kahler, Webster, N.Y., assignors to Xerox Corporation, Rochester, N.Y., a corporation of New York Filed Dec. 19, 1966, Ser. No. 602,787
Int. Cl. G01d *15/06*
U.S. Cl. 346—74 10 Claims

ABSTRACT OF THE DISCLOSURE

Method and apparatus for electrographic recording in which charge is selectively deposited on a dielectric recording material. An electrically conductive support member which supports the dielectric material onto which charge is to be selectively deposited, an electrically conductive plate member spaced from the support member opposite the dielectric material to define a recording gap and an ionizing electrode spaced from the plate member opposite the dielectric material to define an ionization discharge gap are electrically biased to selectively produce a self-maintaining gaseous discharge of an inert gas flowing about the ionizing electrode in the ionization discharge gap. An electric field generated across the recording gap accelerates charged particles through an orifice in the plate member and across the recording gap onto the dielectric material.

BACKGROUND OF THE INVENTION

In general, the present invention relates to methods and apparatus for recording and more specifically to electrographic and electrostatic recording.

The prior art electrostatic and electrographic recording systems produce a latent electrostatic image on a dielectric recording surface. In general, the electrostatic image pattern conforms to a shaped electrode and is produced by virtue of an ionizing electrical discharge from the shaped electrode to a backing electrode behind the dielectric recording medium. Prior electrographic and electrostatic recording techniques employing such electrode devices have exhibited irregular and unreliable charging. A great deal of difficulty has been experienced in obtaining readable copy of sufficient quality under varying conditions with any degree of reliability. This difficulty arises in part from the fact that variations in the atmosphere make control of the charging process difficult. In many systems discharge occurs with only about 95% reliability when an initiating electrical pulse is applied across the electrodes. This lack of reliability occurs because the air does not contain sufficient ionized air molecules produced by normal ionizing influences such as ulta-violet light from the sun, cosmic radiation, prior electrical discharges and the like so that one can depend upon the gap between the electrodes containing sufficient ions on a reliable basis. If sufficient ions are not present between the electrodes when an initiating pulse is applied, the electrical discharge, which depends upon a cascading effect produced by the ions in the gap, will not occur. The prior art has attempted to improve reliability by the use of sources of ultra-violet radiation and by adding water vapor to the recording gap. These attempts while not wholly unsuccessful, have been cumbersome and in some cases have had deleterious effects on the recording apparatus. Further, any variations in the ionizing gas or electrical characteristics of the electrographic or electrostatic apparatus leads to further unreliability. Even in those devices which utilize preionization, the control of the environment is difficult. Random impurities in the gas in the ionization space cause unreliability, uncontrolled discharge initiation, and in some cases lead to an erosion of the electrode and insulating materials. Thus, two major problem areas have resisted the prior attempts at their correction, namely, the control of the random initiation of discharge and the irregularity of the charge laid down.

SUMMARY OF THE INVENTION

Accordingly, it is an object of this invention to provide a new, highly effective electrographic or electrostatic recording method and apparatus which overcomes the deficiencies of the prior art as described above.

It is a further object of this invention to provide an electrographic recording apparatus which will prevent the random undesired initiation of electrical discharge.

Another object of this invention is to provide an electrographic or electrostatic recording method and apparatus which provides a controlled deposition of charge.

A further object of this invention is to provide an electrographic recording apparatus which produces controlled ionization in a controlled environment.

Another object of the present invention is to provide an electrographic recording apparatus in which the discharge gaps and electrical characteristics may be adequately controlled.

It is an additional object of the present invention to provide environmental control for an ion discharge device which eliminates the adverse effects of random atmospheric impurities and unreliable discharge and one which will reduce erosion of the electrode elements.

It is a further object of the present invention to provide a device for the control of the spot size and charge density of the deposited charge pattern.

Another object of the present invention is to provide a device having the capability of printing out charge patterns of varying shapes and dimensions.

These and other objects of the invention are attained by means of an electrically conductive support member which supports a dielectric material onto which charge is to be selectively deposited, an electrically conductive plate member spaced from the support member opposite the dielectric material to define a recording gap, and an ionizing electrode spaced from the plate member opposite the dielectric material to define an ionization discharge gap. The support member, the plate member and recording electrode are electrically biased to selectively produce a self-maintaining gaseous discharge of an inert gas flowing about the ionizing electrode in the ionization discharge gap. An electric field generated across the recording gap accelerates charged particles through an orifice in the plate member and across the recording gap onto the dielectric material.

Other objects of the invention will become readily apparent to those skilled in the art in view of the following detailed disclosure and description thereof, especially when read in conjunction with the accompanying drawings.

BRIEF DESCRIPTION OF THE DRAWINGS

FIGURE 1 is a schematic and block diagrammatic representation of the present invention.

FIGURE 2 is an enlarged cross-sectional representation of the electrographic recording apparatus occurring to the present invention.

FIGURE 3 is a cross-sectional representation of the electrographic recording apparatus according to the present invention taken along the lines 3—3 of FIGURE 2.

FIGURE 4 is a still further enlarged cross-sectional representation of the electrodes of the electrographic recording apparatus according to the present invention.

DESCRIPTION OF THE PREFERRED EMBODIMENTS

Figures 5, 6, 7, 8, 9, 10:
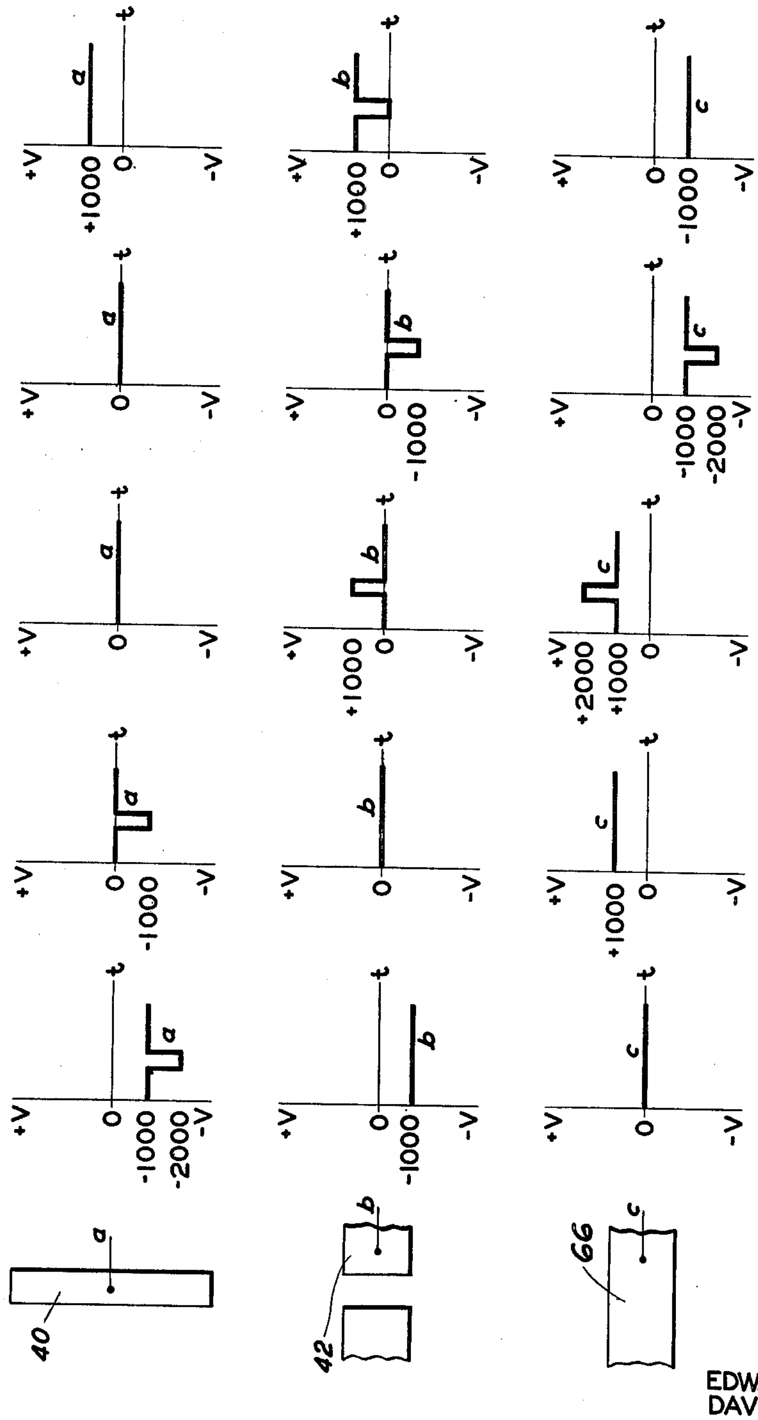
FIGURE 5 is a diagrammatic representation of the electrodes of the electrographic recording apparatus according to the present invention.
FIGURE 6 is a pulse diagram of the potentials applied at each of the electrodes of the electrographic recording apparatus in a preferred embodiment of the present invention.
FIGURES 7–16 are pulse diagrams representing alternative modes of operation of the electrographic recording apparatus according to the present invention.

One possible use of the preferred embodiment of the present invention is shown in FIGURE 1 in which a novel electrographic recording apparatus 20 is provided for selectively charging electrographic paper or other dielectric media 22 for facsimile recording or electrostatic information storage. The deposited charge need not be developed but may be utilized in a manner similar to magnetic tape in an information storage and retrieval system. The deposited charges may be read out or detected by an electrometer. Alternatively, a copy image may be developed on the dielectric media 22 directly or transferred to other media for later development and fixing in accord with processes well known in the electrostatic and xerographic arts. Electrographic recording apparatus 20 may be referred to as an ion gun or ion generator and in its preferred embodiment is a non-contact, ion generating, electrode type ion gun from which charge is selectively deposited on demand on a nearby charge retaining surface such as 22. A unique feature of ion gun 20 which will be discussed in greater detail hereinafter is an enclosed excitation chamber through which an inert gas is uniformly flowing to furnish a constant and controlled excitation environment. This flow of inert gas is indicated in FIGURE 1 by the connection of helium tank 24 to the ion gun 20. The helium source 24 maintains a constant environment by supplying a constant flow of helium at low pressure, for example, less than 0.5 pound per square inch gage pressure, past the electrodes of ion gun 20. Flow rates as low as one milliliter per minute have been found effective. This flow of helium serves to purge the discharge space in the ion gun and maintains a relatively clean, dry, controlled environment for the excitation processes within the ion gun 20.

The scanning of an original document 26 by light 28 and a photoelectrical pickup system 30 produces a signal representative of the information on the original document 26 which after shaping in circuits 32 is appropriately pulsed by pulser 34 and amplified by pulse amplifier 36 to control the operation and discharge of ion gun 20. The discharge of ion gun 20 is synchronized with a recording system to produce copy 22 or other stored information. In particular, circuit logic may be provided which will contribute to the ion gun 20 having greater discharge consistency of sensing the start of the discharge by ion gun 20 and terminating the discharge after a specified period of time. Such circuit logic controls the amount of charge being emitted from the ion gun 20 so that a fixed amount is deposited for each applied pulse produced by pulser 34. It should be noted that when charge deposition is made selective by the introduction of a coded input signal the overall charge pattern that results may be developed by conventional xerographic techniques and thus a facsimile copy may be produced by the present invention. The input pulse may be the result of a chopped viedo signal or the output of a computer or the like. The original document 26 and the copy to be reproduced 22 may be mounted on a single rotating drum for scanning and reproduction or may be mounted on separate, independent, synchronized drums at widely separated locations. Enlarging and other image alterations may be obtained by utilizing various drum diameters and the like. Further, it should be noted that the present invention is in no way limited to the scanning or reproduction of documents mounted on rotating drums, but that a variety of suitable scanning systems may be employed including those in which either the document or the scanning elements are moved or in which both are moved in a coordinated manner.

A more detailed showing of the structure of ion gun 20 is provided by FIGURES 2, 3, and 4. The ion gun 20 consists basically of two electrodes, the main or pin electrode 40 and the control or plate electrode 42. A cylindrical or other conveniently shaped insulating sleeve 44 holds plate electrode 42 in position and provides for an ionization space between pin electrode 40 and plate electrode 42. Plate electrode 42 is held in place on the insulating sleeve 44 by a crimped mounting into retaining groove 46 or by other suitable holding means such as glues, epoxies and the like. A metal fitting 48 through which two connecting holes have been drilled at right angles to each other to provide an inlet 50 and an outlet 52 provides an electrode mount or support member. The insulating sleeve 44 is cylindrical in form with a hole in the center whose diameter is slightly smaller than the outside diameter of the metal fitting outlet connection 52. The insulating sleeve 44 is mounted on the outlet connection 52 of electrode mount 48.

A continuous flow of an inert gas such as helium is continuously provided through tubing 54 into inlet 50 of electrode mount 48, through mount 48 and into outlet 52. The helium flows into the ionization space through slots 56 in pin electrode 40 which is mounted at the end of outlet 52. The positioning of these slots 56 in pin electrode 40 is most clearly shown in FIGURE 3. The gap between the plate electrode 42 and the pin electrode 40 may be set to excite the gas at, for example, approximately 500–600 volts and the applied voltage may be approximately 1,000 volts.

The orifice 58 in the plate electrode affects the spot size of the resultant charge spot deposited on the surface of a dielectric placed at a distance of, for example, 10 to 15 mils from the bottom of plate electrode 42. The diameter of orifice 58 may typically be on the order of approximately 6 mils. The orifice need not necessarily be circular but may take any desired configuration corresponding to the charge pattern desired to be produced. By varying the orifice size and the thickness of plate electrode 42 dot sizes between 3.5 and 40 mils may be obtained. Increasing the thickness of plate electrode 42 increases resolution.

As shown in FIGURE 4 the area between pin electrode 40 which is designated 60 is referred to as the excitation gap. The space between plate electrode 42 and paper 64 is referred to as the recording or acceleration gap 62. The paper or other dielectric 64 is typically mounted on a grounded conductive platen 66 as shown in FIGURE 3.

The helium gas flows into the excitation area 60 after having passed through gas inlet slots 56 which present approximately five by five mil entrances to the ionization region. The plate electrode 42 typically has a thickness on the order of three mils although as noted above its thickness may be increased to increase resolution. Plate electrode 42 receives its potential through a suitable connection to the conductive electrode lead wire 68 which passes through insulating cylinder 44 as shown in FIGURE 2. The plate electrode 42 and pin electrode 40 may be made of conductive materials such as silver, copper, steel, brass, platinum, tantalum, tungsten and the like. The insulating cylinder 44 may be made of any suitable insulating material such as glass, plastics and the like. Any suitable tubing material may be used for the helium supply tube 54. The construction of the embodiment of ion gun 20 illustrated in FIG. 2 may typically have an overall length of approximately three-quarters of an inch. It is clear that any number of suitable electrode and insulating materials may be employed and those herein disclosed are for illustrative purposes only. It should also be clearly understood that while reference is made to a single ion gun as discussed herein, a plurality of such ion guns in a multiplicity of different arrangements and matrixes may be employed within the spirit and scope of the present invention. One such embodiment is described in detail below. It should be noted that the dimensions, spacings and potentials as herein provided are typical and illustrtative of a preferred embodiment of the present invention but may be varied within large ranges depending upon the recording speeds, the distance to the dielectric sheet, the electrode spacing and applied potentials. The electron gun as above described has several noteworthy characteristics. Firstly, it provides for the controlled initiation of discharge in a special chamber supplied with a controlled environment in the form of a steady flow of an inert or nonreactive gas such as helium. Secondly, the discharge is initiated between electrodes having a fixed spacial and electrical relationship. Thirdly, the ion gun device consists of two distinct but not unrelated areas: (1) an internal excitation chamber 60 and (2) an external acceleration gap 62 between the plate electrode 42 and the paper platen 66. The excitation gap voltage to be employed is a function of the gap geometry, spacing, and the percent recovery of the molecules in the gap from the previous pulse discharge as well as other parameters. The helium gas provides for rapid quenching and cooling of electrode 40, and the excitation gap 60 may be purged after discharge by a non-excited stream of the helium gas which prevents an early initiation of the next discharge. Area 60 provides a totally enclosed and isolated discharge initiating, excitation space having a controlled environment provided by the flow of inert or nonreactive gas such as helium which continuously flows through the space 60 purging it. The discharge initiating gap in space 60 is constant and is not dependent upon the space between the platen 66 and the plate electrode 42. The space 60 is enclosed and shielded and thus not subject to atmospheric conditions, drafts, or contamination. The inert or nonreactive gas such as helium retards electrode contamination and alteration. The helium gas also provides for superior electrode cooling and for more prompt and complete discharge quenching. The spacing of plate electrode 42 from paper 64 may be, for example, on the order of 10–20 mils and is not critical. The plate electrode 42 and paper platen 66 provide a parallel geometric configuration which provides an electronic lens to aid in focusing the discharge ions or electrons in the external acceleration gap 62 thereby inhibiting their spread in this gap and allowing for the uncritical spacing of electron gun 20 and plate electrode 42 from the surface of paper 64.

While it is not intended to limit the invention to any specific theory of operation, it is presently believed that the following may be advanced as a hypothesis describing the general operation of the ion gun 20. As the helium or a similar inert, non-reactive gas passes through the ion gun 20, it passes into slots 56 of pin electrode 40. After the helium leaves slots 56 in pin electrode 40, it encounters a region of high electromagnetic field at the corner of pin electrode 40, between pin electrode 40 and plate electrode 42. In this region excitation takes place. It should be noted that the mechanisms by which excitation takes place may include but are not necessarily limited to excitation by the absorption of electromagnetic radiation, excitation by collision, excitation by electron bombardment, and ionization processes. The gas tends to break down at the corners of the pin electrode 40. The electrons and ions formed in this region are not believed to be useful for charge deposition since they are for the most part attracted to the electrodes 40 and 42 before they can reach the orifice 58. However, neutral metastable atoms which are not affected by the electric fields in this region are, also, produced in the high field regions. These metastables can flow toward the orifice 58. The metastable atoms and molecules which reach orifice 58 may ionize the gases of the air which mix with them in the area of orifice 58, if their excitation energy is larger than the ionization energy of the particular gas. Some of the metastables may, however, be deactivated by wall collisions and atomic collisions before reaching the region of orifice 58. Even in this case the ionization discharge may be effectively propagated to the orifice 58 by means of the Auger effect which results in the ejection of electrons from the electrodes when bombarded by metastable atoms.

Of the inert gases helium metastables are the best Auger electron emitters. Helium has the highest metastable energy of the inert gases at approximately 19.8 ev. This level of metastable energy is effective in the ionization of the air in the region of the orifice 58 since it exceeds the ionization energies of the pertinent gas species such as $N_2$, $O_2$, NH, and OH. Further, helium has the highest diffusion rate of the inert gases. Thus because the helium metastables are capable of effectively propagating the ionization discharge from the edges of pin electrode 40 toward the orifice 58 and because the helium metastables are capable of effectively ionizing the molecules of the air as the helium metastables and charges produced by them flow out of orifice 58, helium is the preferred flow gas. Regardless of the mechanisms involved, the excited helium passes through gap 60 to the area of the orifice 58. In the area of orifice 58 an interaction between the excited helium and air molecules takes place which results in the formation of many ions and free electrons. Ionic species such as $N_2+$, OH+ and NH+ have been identified by analysis of the emission spectra. The negative species have not been identified since no known negative species have emission spectra, but are known to be present in sufficient numbers to provide for effective charge deposition on paper 64 or platen 66. The orifice 58 emits these charges among others. Charges of the desired polarity are drawn down to the paper 64 across acceleration gap 62, by electrastatic forces. The geometry of orifice 58 largely determines the spot size of the deposited charge. While any inert or non-reactive gas may be used as the flow gas it presently appears that helium is uniquely effective in the ionization process as described above in the present ion gun configuration and has been found to be much more reliable than any other flow gas tested in producing ionization in the air gap when the recording pulse is applied. The electromagnetic and electrostatic fields referred to above are produced in any one of the several modes of operation discussed below. It should be noted that for the sake of clarity of disclosure and simplicity of explanation, the operation of the ion gun has been described above in terms of a theory of operation as presently understood although it is to be clearly understood that this theory is illustrative only and is not intended to be interpreted in limitation of the scope of the invention.

Several different modes of addressing the electrodes of ion gun 20 and of applying electrical potential to the ion gun 20 may be utilized. Examples of some of the various modes are given in FIGURES 5 through 17. These showings are not intended to be exhaustive but rather to provide an indication of the various ways in which the present invention may be operated. By way of introduction to the various modes, it may be considered that in general two basic modes exist, namely: (1) the pulsed mode in which the pin electrode 40 and the plate electrode 42 are at or near the same potential except during the pulsing of either the plate electrode 42 or the pin electrode 40 (this mode provides a constant field in the accelerating gap 62 and selectively produced ions) and (2) the constant potential or DC mode in which the pin electrode 40 and the plate electrode 42 are separated by some constant potential say, for example, approximately 400 volts (this mode provides a constant source of ions subject to a selectively pulsed field in the acceleration gap 62). Several variations on each of these types are shown in the pulse diagrams of FIGURES 6 through 16. One more sophisticated electronic variation involving a pulse induced pulsed field is shown in detail in FIGURES 17 through 20. In general, an accelerating field on the order of approximately 70 volts/mil is employed, by way of example, during the "write" cycle.

A preferred mode of operation of the present invention is shown in FIGURES 5 and 6. In this preferred mode platen 66 in FIGURE 5 is maintained at a potential *c* which as indicated by the corresponding pulse diagram in FIGURE 6 is ground potential. The plate electrode 42 in FIGURE 5 is maintained at a potential *b* which is shown in the corresponding pulse diagram of FIGURE 6 to be a negative potential of 1,000 volts. The pin electrode 40 in FIGURE 5 is subject to a potential *a* which is negative potential of 1,000 volts pulsed by a high voltage pulser to a negative potential of 2,000 volts during the "write" cycle of the ion gun 20. The potentials indicated here are for purposes of discussion and example and may be varied over a wide range of values in accordance with the present invention as described herein. Further, while a wide variety of driving pulse control methods have been found to be satisfactory, the pulse frequency method is presently considered as the preferred embodiment.

An alternative mode of opration is shown in FIGURE 7 in which the platen 66 is held at a positive potential of 1,000 volts while the plate electrode 42 is held at ground potential. A negative pulse on the order of 1,000 volts is applied to the pin electrode 40 to "write."

Two other alternatives are indicated in FIGURES 8 and 9. In both pin electrode 40 is grounded. The plate electrode 42 and the platen 66 are electronically coupled so that both may be pulsed at the same time. In the alternative shown in FIGURE 8 the plate electrode 42 is initially at ground and the platen is at a positive potential of 1,000 volts. Both the plate electrode 42 and the platen 66 receive a positive pulse on the order of 1,000 volts. In the alternative of FIGURE 9 a negative pulse of approximately 1,000 volts is applied to both the plate electrode 42 which is initially at ground and to the platen 66 which is at a negative potential of 1,000 volts prior to the pulse.

In the alternative indicated in FIGURE 10 the pin electrode 40 and the plate electrode 42 are biased positively at 1,000 volts. A negative going pulse is applied to the plate electrode 42 driving its potential to ground. The platen 66 is maintained negative at a potential on the order of 1,000 volts.

Figures 11, 12, 13, 14, 15, 16:
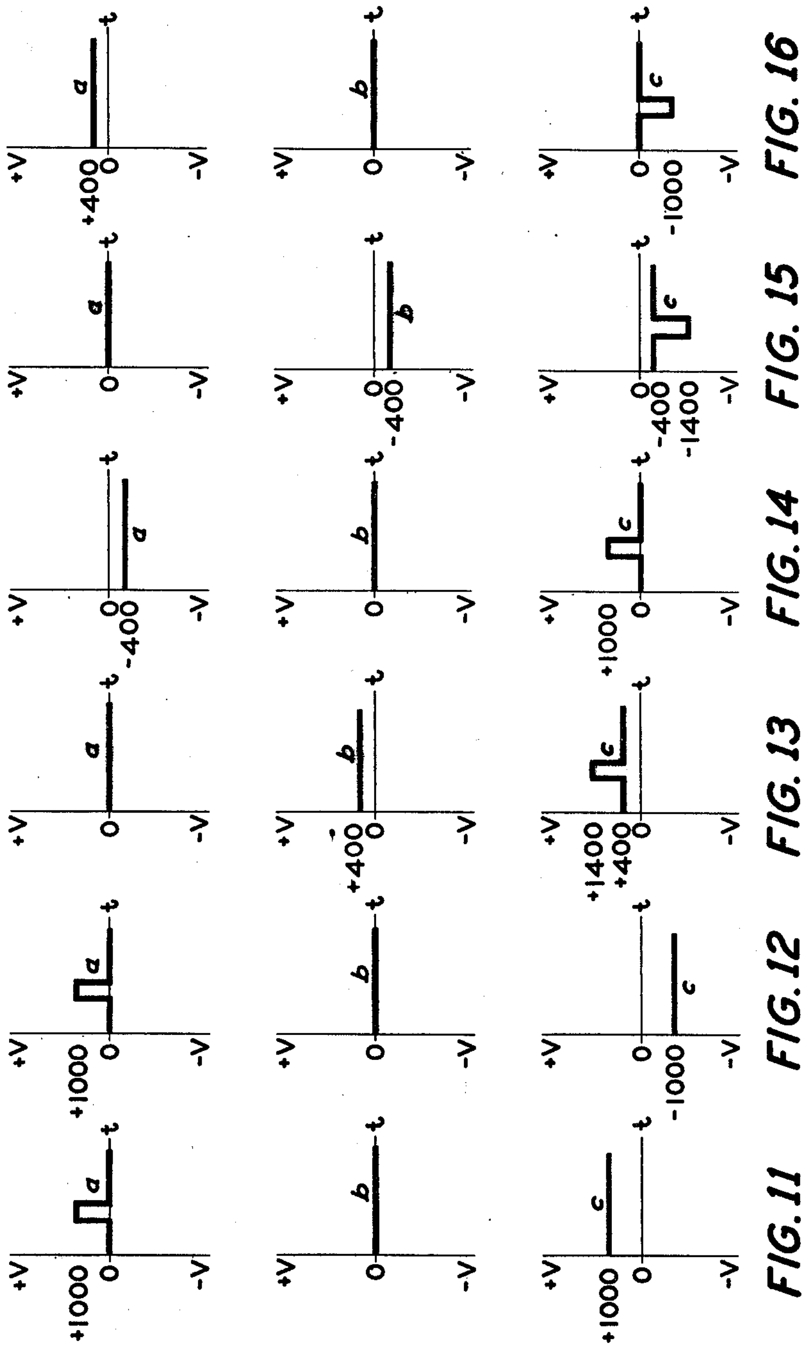

FIGURE 11 shows an alternative in which the plate electrode 42 is maintained at ground while platen 66 has a positive potential of approximately 1,000 volts. A positive pulse on the order of 1,000 volts is applied to pin electrode 40 to produce "write" conditions.

In the alternative of FIGURE 12 the platen 66 is maintained at a negative potential of approximately 1,000 volts and the plate electrode 42 at ground potential. A pulse having a positive potential of approximately 1,000 volts is applied to the pin electrode 40 to produce the conditions necessary for charge transfer.

It may be noted that in the above alternative modes the pulse is applied between the pin electrode 40 and the plate electrode 42 and that therefore the above may be considered broadly to be representative of some of the variations in the pulsed mode.

The following four alternatives may likewise be considered representative of some of the variations in what has been broadly termed the continuous or DC mode.

FIGURE 13 shows an alternative mode of operation in which the pin electrode 40 is held at a ground potential and the plate electrode 42 is held at a positive potential of approximately 400 volts with respect to such ground potential. The platen 66 is pulsed positively approximately 1,000 volts from an initial positive potential of approximately 400 volts.

It may be noted that FIGURE 14 represents an alternative mode which is identical to that shown in FIGURE 13 except that ground or reference potential may be considered translated in a negative direction 400 volts. Such variations are possible with regard to all of the other embodiments discussed herein and may result in the deposition of charge of either polarity.

Another variation of the DC or continuous mode is shown in FIGURE 15 in which the pin electrode 40 is held at ground potential and the plate electrode 42 is held at a negative potential approximately 400 volts below ground. A negative going pulse of approximately 1,000 volts is applied to the platen 66 which is initially at a negative potential of approximately 400 volts.

FIGURE 16 represents the mode of operation shown in FIGURE 15 in which the reference or ground potential has been translated in a positive direction approximately 400 volts.

Any of a wide variety of pulse circuits may be employed in a conventional manner to operate in the above described modes.

Figures 17, 18, 20:
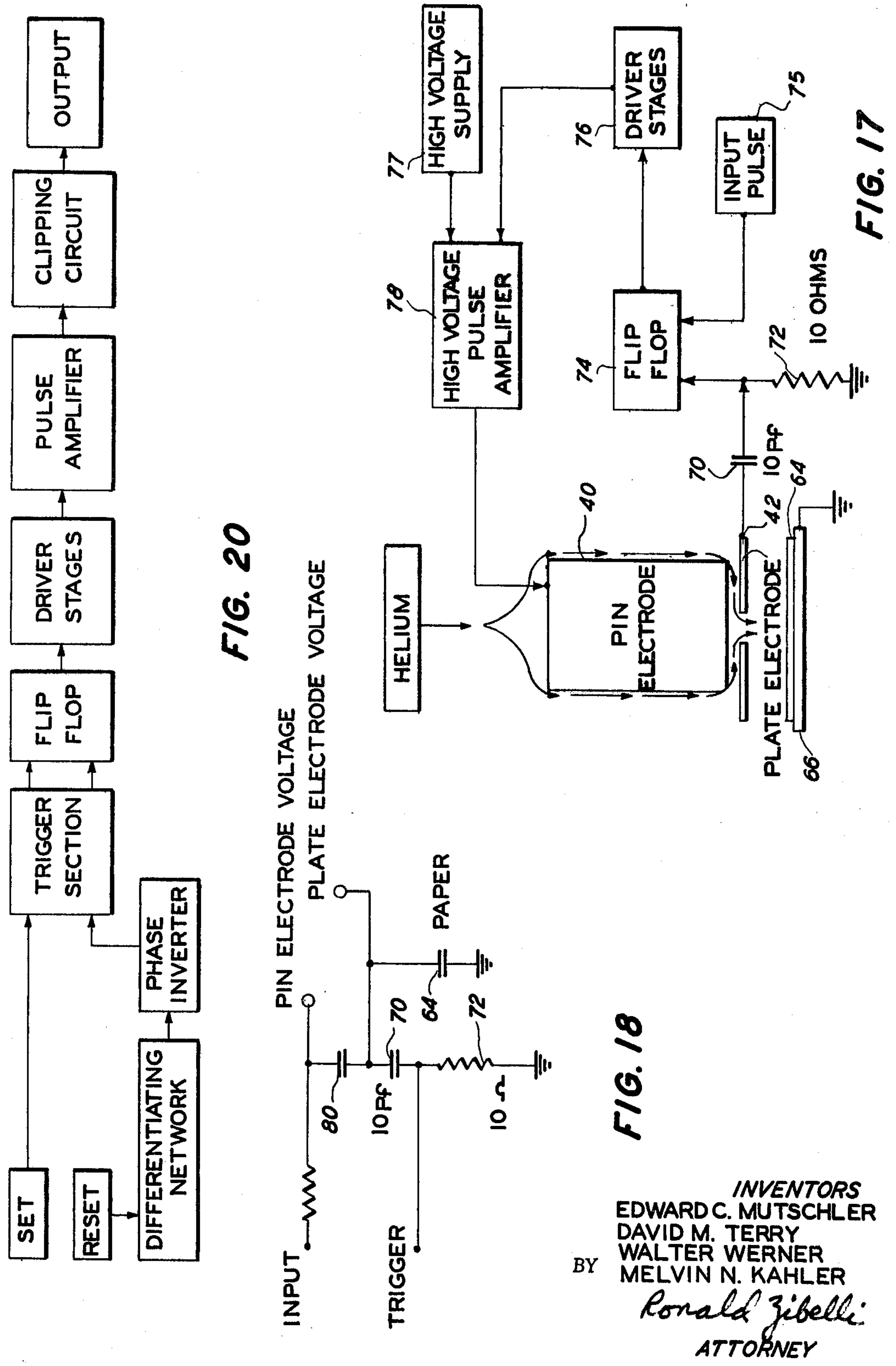
FIGURE 17 is a schematic representation in block diagram form of the electrical circuits associated with the electrographic recording apparatus in an alternative embodiment of the present invention.
FIGURE 18 is a schematic, diagrammatic representation of the effective electrode circuits of the embodiment of the present invention as indicated by FIGURE 17.
FIGURE 20 is a block diagrammatic representation of the circuit logic shown in FIGURE 19.
Figure 19:
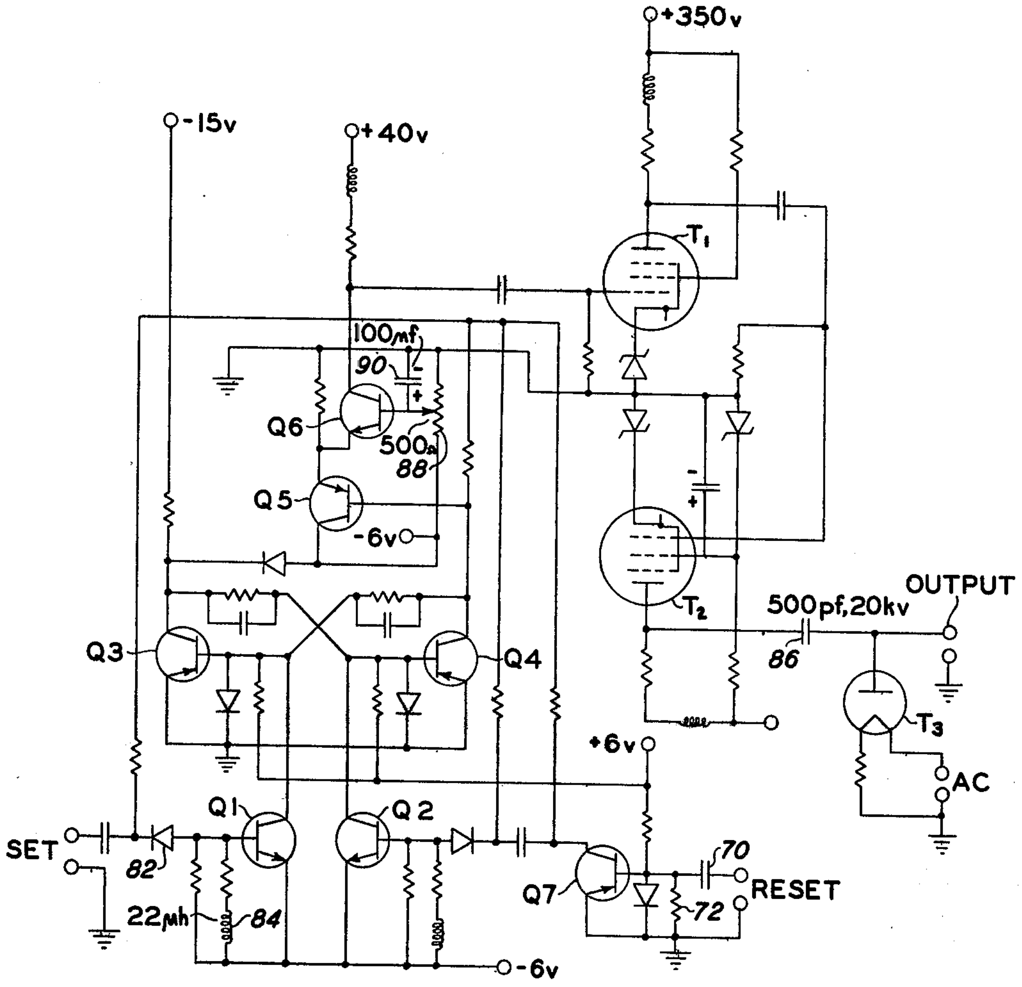
FIGURE 19 is a schematic representation of the circuit logic of the embodiment of the present invention indicated by FIGURE 17.

An alternative mode of pulsed operation which provides additional control of the pulse is shown in FIGURES 17 through 20. The circuit logic employed in this alternative embodiment of the present invention contributes to the discharge consistency by sensing the start of the discharge and terminating the discharge after a specified period of time. This action controls the total charge being emitted from the ion gun 20 so that a fixed amount of charge is produced for each applied pulse. The block schematic diagram shown in FIGURE 17 depicts this aspect of the operation of ion gun 20. The 10 pf. capacitor 70 the 10 ohm resistor 72 form a differentiating network which senses the sudden change in plate electrode 42 voltage that occurs at the moment of breakdown. A variable delay in the flip-flop elements 74 allows a predetermined amount of time to elapse from the start of the discharge until the pulse applied through the driver stages 76 and a high voltage pulse amplifier 78 to the pin electrode 40 is turned off. The high voltage pulse amplifier 78 derives its potential from a high voltage power supply 77. The input pulse 75 may be the result of a chopped video input or a computer output or the like. The circuits applied to ion gun 20 are such that at the start of the pulse the pin electrode 40 starts to go negative, but at a much slower rate. This fact may be seen by examining the effective circuit shown in FIGURE 18. In the equivalent circuit of FIGURE 18 the pin electrode-plate electrode capacitance 80 is in series with the 10 pf. capacitance of differentiating capacitor 70 for the trigger signal. The applied potential will divide between the two capacitances. Thus, the plate electrode 42 moves toward a less negative potential than the pin electrode 40. Because of the different potential on the pin electrode 40 and the plate electrode 42, about 0.1 μsec., depending on pulse rise rate, after the start of the pulse it reaches a potential of approximately 600 volts and the excitation gap between the pin electrode 40 and the plate electrode 42 becomes conductive. The required potential is a function of both the gap geometry and spacing, and in addition it may be influenced by the percent recovery of the gap from the previous discharge pulse as well as other parameters. At this point there is a low resistance path between the pin electrode 40 and the plate electrode 42, and the plate electrode 42 drops rapidly to within about 200 volts of the pin electrode 40. The difference can be thought of as an I.R. drop where the effective resistance of the gap times the current yields this voltage. The magnitude of the gap current and thereby the gap voltage is also affected by the other external parameters. It is at approximately this point in time at which ions in the region of the pin electrode 40 pass through the orifice 58 in the plate electrode 42 and head toward the paper 64 with grounded backing electrode 66. About 0.8 μsec. later the pin electrode 40 reaches its maximum negative peak as the time delay control on the reset pulse is adjusted for this duration. The flip-flop 74 returns to its original condition and the pin electrode 40 starts back toward ground potential and the discharge is extinguished. This returns the system to the original capacitor concept of FIGURE 18 and the plate electrode 42 starts to discharge back to its normal voltage. The pin electrode 40 and plate electrode 42 return to equilibrium awaiting the next pulse. The detailed operation of the circuit logic described above is best seen in FIGURE 19. The two trigger transistors $Q_1$ and $Q_2$ are initially cut off as is flip-flop transistor $Q_3$. The other flip-flop transistor $Q_4$ is on. When a positive going signal is applied at the set terminals, the input diode 82 turns off and the field around the 22 uh inductor 84 in the base circuit of $Q_1$ collapses generating a positive voltage at the base which turns transistor $Q_1$ on. Turning transistor $Q_1$ on lowers the base of transistor $Q_3$ which turns it on and by normal flip-flop action transistor $Q_4$ is turned off. When transistor $Q_4$ turns off, a negative going signal is applied to transistor $Q_5$. Transistor $Q_5$ is an emitter follower whose output drives the common base amplifier $Q_6$ which in turn applies a negative going signal to tube $T_1$. Since tube $T_1$ is a conventional amplifier, there is a 180 degree phase reversal at its output, so that the signal applied to the control grid of tube $T_2$ will be positive going and will produce a negative going signal at its output terminals.

The 500 pf. capacitor 86 and tube $T_3$ serve as a clip on the output and damp any positive going overshot when tube $T_2$ is turned off. When the reset pulse is sensed from the plate electrode 42 of the ion gun 20, it passes through a phase invertor $Q_7$ and then to transistor $Q_2$ with the result that the circuit flops back to the original condition in the same manner in which it was originally flipped. 500 ohm pot resistor 88 and the 100 mf. capacitor 90 in the base circuit of transistor $Q_6$ permits a variable delay of a few tenths of a microsecond from the time the trigger pulse is received until the signal is applied to the control grid of tube $T_1$. The above noted values have been presented for purposes of illustration only as typical values; however these values may be altered greatly as other circuit elements including a wide variety of transistors and tubes are employed. The remaining circuit elements, shown in FIGURE 19 to provide a complete schematic representation, are conventional, and have values determined by the characteristics of the transistors and tubes employed and will vary in value as the other static circuit elements are varied. In specific cases their values are determined by the necessity to provide a proper magnitude of potential between pin electrode 40 and plate electrode 42. Since a discussion of their conventional functions and magnitudes is not necessary for an understanding of the present invention except as has been set forth above for purposes of illustration, the remaining circuit elements in FIGURE 19 will not be discussed further.

A summary of the above schematic diagram is provided in FIGURE 20 in block diagram form.

Figure 21:
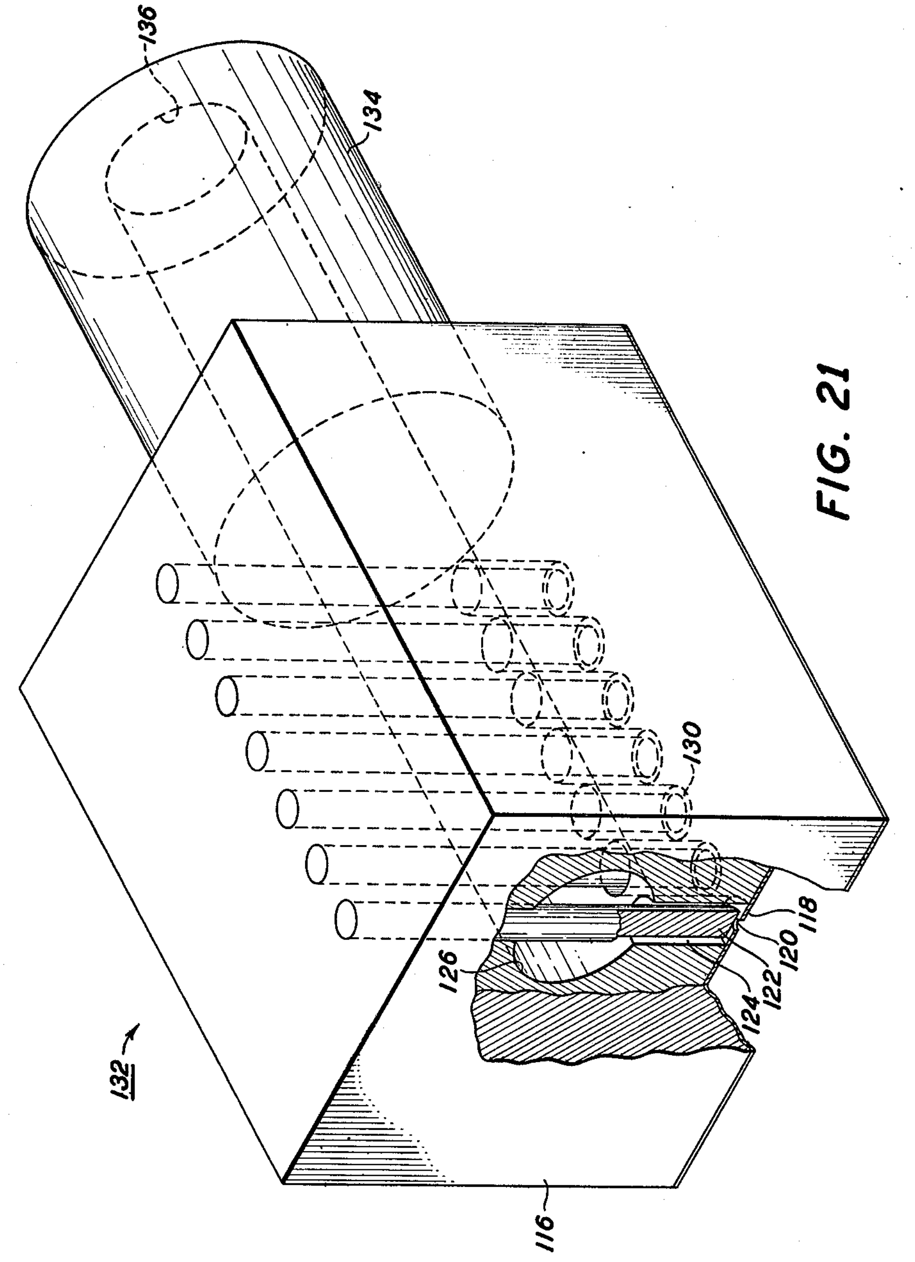
FIGURE 21 is a perspective representation of an array of electrographic recording devices according to the present invention.

Numerous variations of the ion gun present themselves to those skilled in the art. One such variation is the use of a plurality of ion guns in an array or matrix for printing out a multiplicity of characters or at a plurality of points simultaneously. One of many possible configurations of such an array is shown in FIGURE 21. The ion gun head 132 consists of an electrically insulating housing 116 containing seven independently addressable ion guns 130 spaced at, for example, 14 mil center-to-center separations. An inlet 136 in an extended portion 134 of ion gun head 132 provides for a flow of helium into chamber 126 which is common to the seven ion guns 130. Each ion gun 130 consists of a helium chamber 124 surrounding a pin electrode 122. The bottom of the chamber 124 is closed by plate electrode 118 with orifice 120. The electrodes of each ion gun may be electrically connected and operated in the same manner as described above with regard to the single ion gun. The helium flow in this embodiment is from chamber 126 and into 124 and around the pin electrode 122, between the pin electrode 122 and plate electrode 118 and out orifice 120 in the same manner as described for the single ion gun. Either separate conductive elements or a single sheet of conductive material with appropriately spaced holes may be utilized as the plate electrodes 118. In the latter event one of the modes of operation described above employing a grounded plate electrode is particularly convenient for use with this multiple ion gun array although other modes may be used. Any of the various materials and configurations noted above with regard to the single ion gun configuration are also applicable to the disclosed multi-ion gun matrix.

Figure 22:
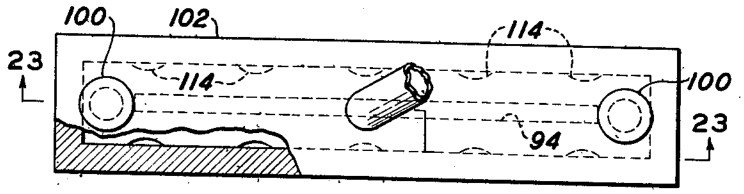
FIGURE 22 is a top view of an alternative embodiment of the present invention.
Figure 23:
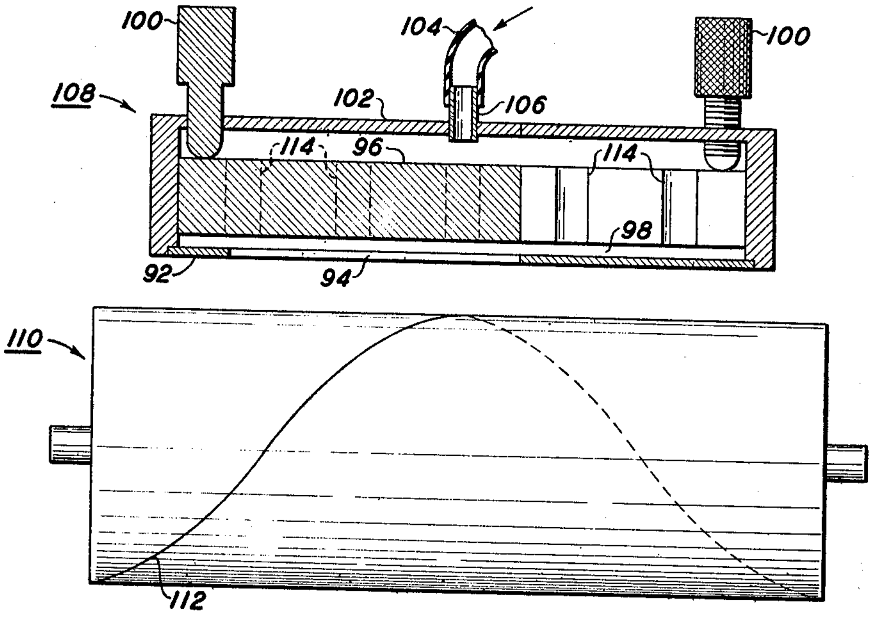
FIGURE 23 is a partial, cross-sectional representation of an alternative embodiment of the present invention.

Among the variations of the ion gun configurations which present themselves to those skilled in the art is one referred to as the "line gun." This alternative embodiment consists of an ion gun configuration which will provide a line source of ions in a manner similar to the circular source as described above. Such an embodiment is shown in FIGURES 22 and 23. The structure of this ion gun consists of a metal plate 92 with a narrow slit 94 which is, for example, approximately 0.006 inch wide and approximately 8.5 inches long. Behind slit 94 a narrow bar of metal 96 is placed in close proximity to plate 92. The excitation or ionization region 98 between bar 96 and plate 92 is filled with helium at low pressure which purges the region 98 and maintains a constant environment as described above. The adjustment taps 100 in conjunction with bias means (not shown) in housing 102 allow the excitation gap to be set so that a consistent discharge may be obtained down the entire length of the slit 94. The helium gas is fed through the top of housing 102 by means of tubing 104 connected to an extension of the housing orifice 106 and thence through helium bypasses 114 to excitation region 98. The slit gun 108 is supported above a rotatable drum 110 in which a helical wire electrode 112 has been placed. A typical technique for selectively charging a dielectric (not shown) passing between the gun 108 and the helical electrode 112 is to pulse the gun 108 continuously at a suitable frequency with negative going pulses applied to the bar 96 with the plate 92 held at ground potential. The helical wire 112 can then be positively pulsed which would selectively attract ions from the gap at the point of intersection between the slit 94 and the helical wire 112.

An alternative mode of operation is to place a constant positive potential on the helical wire 112 and selectively pulse the bar 96 negatively holding the plate 92 at ground which would again result in the deposition of charge at the point of intersection of the helix wire 112 and the slit 94.

Development of the image produced on the dielectric medium may be by any standard xerographic method or technique such as magnetic brush, fur brush, or cascade development.

Variations in the rate of rotation of the helix and in the paper speed determine the print out speed and the relative format of the copy image.

The wide variety of materials and modes of operation which have been indicated above as applicable to the present invention are also applicable to the line gun configuration.

While the invention has been described with reference to preferred embodiments, it will be understood by those skilled in the art that various changes may be made and equivalents may be substituted for elements thereof without departing from the true spirit and scope of the invention.

What is claimed is:

1. A method for selectively charging a dielectric material comprising, presenting a dielectric material on an electrically conductive support member proximate to an ionizing electrode and an electrically conductive plate member having an orifice therein, said electrically conductive plate member being spaced from said ionizing electrode to define an ionization discharge gap therebetween and said dielectric material to define a recording gap, directing a continuous flow of inert gas about said ionizing electrode in said ionization discharge gap through said orifice and into said recording gap, and applying an electrical potential to said support member, said plate member and said ionizing electrode to selectively produce a self-maintaining gaseous discharge of said inert gas flowing through said discharge gap and generating an electric field across said recording gap to accelerate charged particles through said orifice and across said recording gap onto said dielectric material.

2. A method for selectively charging a dielectric material comprising, presenting a dielectric material on an electrically conductive support member proximate to an ionizing electrode and an electrically conductive plate member having an orifice therein, said electrically conductive plate member being spaced from said ionizing electrode to define an ionization discharge gap therebetween and said dielectric material to define a recording gap, directing a continuous flow of inert gas about said ionizing electrode in said ionization discharge gap through said orifice and into said recording gap, applying an initial electrical potential to said support member, said plate member and said ionizing electrode, the differential between the initial potentials respectively applied being at a level insufficient to initiate an ionization discharge of said inert gas within said discharge gap, and selectively varying at least one of the potentials respectively applied from the initial level to a second level sufficient to initiate a self-maintaining gaseous discharge of said inert gas flowing through said discharge gap, said second level maintaining an electric field across said recording gap to accelerate charged particles through said orifice and across said recording gap onto said dielectric material.

3. Apparatus for selectively charging a dielectric material comprising, an electrically conductive support member for supporting a dielectric material onto which charge is to be selectively deposited, an ionizing electrode spaced from said dielectric support member opposite the dielectric material, an electrically conductive plate member having an orifice therein, said plate member being spaced between said ionizing electrode and said dielectric material to define an ionization discharge gap between said plate member and said ionizing electrode and a recording gap between said plate member and said dielectric material, means for producing a continuous flow of inert gas about said ionizing electrode in said ionization discharge gap through said orifice and into said recording gap, and means for applying an electrical potential to said support member, said plate member and said ionizing electrode to selectively produce a self-maintaining gaseous discharge of said inert gas flowing through said discharge gap and generate an electric field across said recording gap to accelerate charged particles through said orifice and across said recording gap onto said dielectric material.

4. Apparatus for selectively charging a dielectric material comprising, an electrically conductive support member for supporting a dielectric material onto which charge is to be selectively deposited, an ionizing electrode spaced from said dielectric support member opposite the dielectric material, an electrically conductive plate member having an orifice therein, said pfilate member being spaced between said ionizing electrode and said dielectric material to define an ionization discharge gap between said plate member and said ionizing electrode and a recording gap between said plate member and said dielectric material, means for producing a continuous flow of inert gas about said ionizing electrode in said ionization discharge gap through said orifice and into said recording gap, circuit means for applying an initial electrical potential to said support member, said plate member and said ionizing electrode, the differential between the initial potentials respectively applied being at a level insufficient to initiate an ionization discharge of said inert gas within said discharge gap, and means for selectively varying at least one of the potentials respectively applied from the initial level to a second level sufficient to initiate a self-maintaining gaseous discharge of said inert gas flowing through said discharge gap, said second level maintaining an electric field across said recording gap to accelerate charged particles through said orifice and across said recording gap onto said dielectric material.

5. Electrographic recording apparatus for selectively depositing charge on a dielectric material comprising, an electrically conductive support member for supporting a dielectric material onto which charge is to be selectively deposited, an electrically conductive plate member spaced from said support member opposite said dielectric material to define a recording gap, an electrically insulating member connected to said plate member opposite said recording gap, an ionizing electrode supported within said insulating member and spaced from said plate member to define an ionization discharge gap, means for producing a continuous flow of inert gas about said ionizing electrode in said ionization discharge gap and into said recording gap including an orifice in said plate member centrally disposed with respect to said ionizing electrode, and means for applying an electrical potential to said support member, said plate member and said ionizing electrode to selectively produce a self-maintaining gaseous discharge of said inert gas flowing through said discharge gap and generate an electric field across said recording gap to accelerate charged particles through said orifice and across said recording gap onto said dielectric material.

6. Electrographic recording apparatus for selectively depositing charge on a dielectric material comprising, an electrically conductive support member for supporting a dielectric material onto which charge is to be selectively deposited, an electrically conductive plate member spaced from said support member opposite said dielectric material to define a recording gap, an electrically insulating member connected to said plate member opposite said recording gap, an ionizing electrode supported within said insulating member and spaced from said plate member to define an ionization discharge gap, means for producing a continuous flow of inert gas about said ionizing electrode in said ionization discharge gap and into said recording gap including an orifice in said plate member centrally disposed with respect to said ionizing electrode, means for applying an initial electrical potential to said support member, said plate member and said ionizing electrode the differential between the respectively applied initial potentials being at a level insufficient to initiate an ionization discharge of said inert gas within said discharge gap, means for selectively pulsing at least one of said electrical potentials from said initial level to a second level sufficient to initiate a self-maintaining gaseous discharge of said inert gas flowing through said discharge gap, and means for maintaining an electric field across said recording gap during said self maintaining gaseous discharge to accelerate charged particles through said orifice and across said recording gap onto said dielectric material,

7. Apparatus for selectively charging a dielectric material comprising, an electrically conductive support member for supporting a dielectric material onto which charge is to be selectively deposited, a plurality of ionizing electrodes spaced from said dielectric support member opposite the dielectric material, an electrically conductive plate member having a plurality of orifices therein, said plate member being spaced between said ionizing electrodes and said dielectric material to define a plurality of ionization discharge gaps between said plate member and said ionizing electrodes and a recording gap between said plate member and said dielectric material, means for producing a continuous flow of inert gas about said ionizing electrodes in said ionization discharge gaps through said orifices and into said recording gap, and means for applying an electrical potential to said support member, said plate member and said ionizing electrodes to selectively produce self-maintaining gaseous discharges of said inert gas flowing through said discharge gaps and generate an electric field across said recording gap to accelerate charged particles through the respective orifices and across said recording gap onto said dielectric material.

8. Apparatus for selectively charging a dielectric material comprising, an electrically conductive support member for supporting a dielectric material onto which charge is to be selectively deposited, a plurality of ionizing electrodes spaced from said dielectric support member opposite the dielectric material, an electrically conductive plate member having a plurality of orifices therein, said plate member being spaced between said ionizing electrodes and said dielectric material to define a plurality of ionization discharge gaps between said plate member and said ionizing electrodes and a recording gap between said plate member and said dielectric material, means for producing a continuous flow of inert gas about said ionizing electrodes in said ionization discharge gaps through said orifices and into said recording gap, circuit means for applying an initial electrical potential to said support member, said plate member and said ionizing electrodes, the differential between the initial potentials respectively applied being at a level insufficient to initiate an ionization discharge of said inert gas within said discharge gaps, and means for selectively varying at least one of the potentials respectively applied from the initial level to a second level sufficient to selectively initiate self-maintaining gaseous discharges of said inert gas flowing through selected ones of said discharge gaps, said second level maintaining an electric field across said recording gap to accelerate charged particles through the respective orifices and across said recording gap onto said dielectric material.

9. Electrographic recording apparatus for selectively depositing charge on a dielectric material comprising, an electrically conductive support member for supporting a dielectric material onto which charge is to be selectively deposited, an electrically conductive plate member spaced from said support member opposite said dielectric material to define a recording gap, an electrical insulating member connected to said plate member opposite said recording gap, a plurality of ionizing electrodes supported within said insulating member and spaced from said plate member to define a plurality of ionization discharge gaps, means for producing a continuous flow of inert gas about said ionizing electrodes in said ionization discharge gaps and into said recording gap including a plurality of orifices in said plate member centrally disposed to respectively associated ionizing electrodes, and means for applying an electrical potential to said support member, said plate member and said ionizing electrodes to selectively produce self-maintaining gaseous discharges of said inert gas flowing through selected ones of said discharge gaps and generate an electric field across said recording gap to accelerate charged particles through the respective orifices and across said recording gap onto said dielectric material.

10. Electrographic recording apparatus for selectively depositing charge on a dielectric material comprising, an electrically conductive support member for supporting a dielectric material onto which charge is to be selectively deposited, an electrically conductive plate member spaced from said support member opposite said dielectric material to define a recording gap, an electrically insulating member connected to said plate member opposite said recording gap, a plurality of ionizing electrodes supported within said insulating member and spaced from said plate member to define a plurality of ionization discharge gaps, means for producing a continuous flow of inert gas about said ionizing electrodes in said ionization discharge gaps and into said recording gap including a plurality of orifices in said plate member centrally disposed to respectively associated ionizing electrodes, means for applying an initial electrical potential to said support member, said plate member and said ionizing electrodes, the differential between the respectively applied initial potentials being at a level insufficient to initiate ionization discharges of said inert gas within said discharge gaps, means for selectively pulsing at least one of said electrical potentials from said initial level to a second level sufficient to initiate self-maintaining gaseous discharges of said inert gas flowing through selected ones of said discharge gaps, and means for maintaining an electric field across said recording gap to accelerate charged particles through said orifices and across said recording gap onto said dielectric material.

References Cited

UNITED STATES PATENTS

| | | | |
|---|---|---|---|
| 1,926,406 | 9/1933 | Rieber | 179—100.3 |
| 1,969,143 | 8/1934 | Metcalf | 179—100.3 |
| 2,931,688 | 4/1960 | Innes et al. | 346—74 |
| 3,023,070 | 2/1962 | Benn | 346—74 |
| 3,130,411 | 4/1964 | Schwertz | 346—74 |
| 3,321,768 | 5/1967 | Byrd | 346—74 |
| 3,358,289 | 12/1967 | Lee | 346—74 |
| 3,372,400 | 3/1968 | Epstein | 346—74 |

BERNARD KONICK, Primary Examiner

RAYMOND F. CARDILLO, Jr., Assistant Examiner

U.S. Cl. X.R.

250—41.9